June 29, 1965 W. L. LUND 3,191,657
TIRE CHANGER FOR SPOKED WHEELS
Filed Aug. 16, 1963
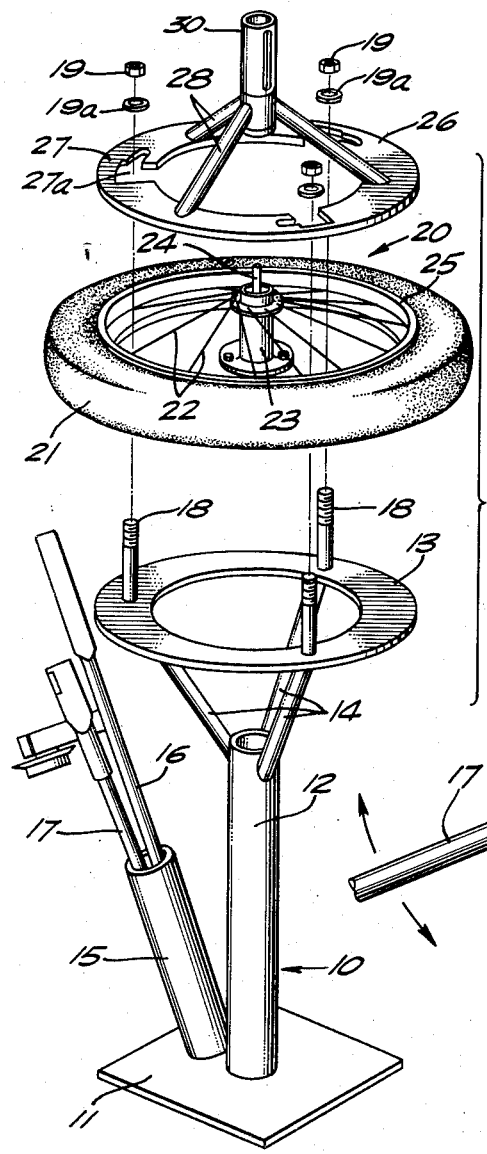
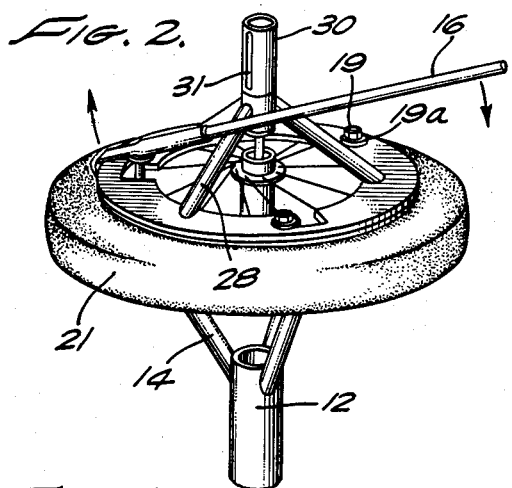
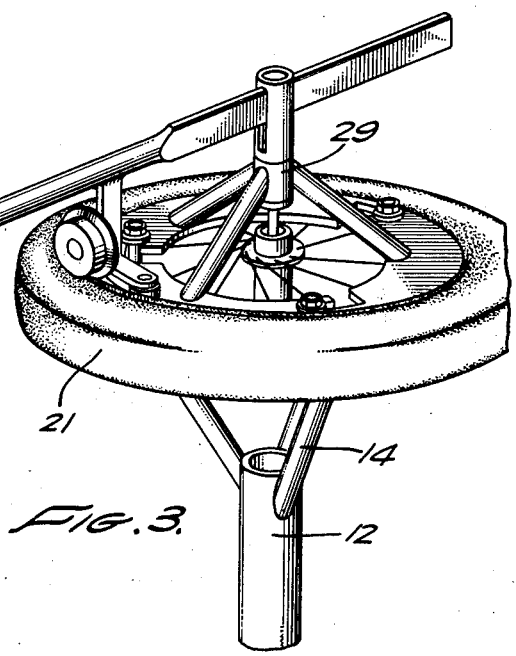
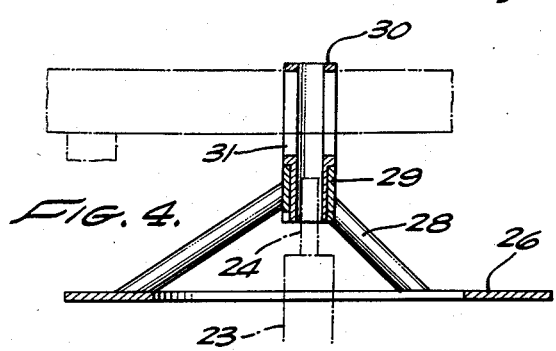
WALTER L. LUND
INVENTOR.
BY
ATTORNEYS

United States Patent Office 3,191,657
Patented June 29, 1965

3,191,657
TIRE CHANGER FOR SPOKED WHEELS
Walter L. Lund, 13019 S. Barlin Ave., Downey, Calif.
Filed Aug. 16, 1963, Ser. No. 302,675
5 Claims. (Cl. 157—1.24)

This invention relates to vehicle wheels and more specially to a tire changer for spoked wheels.

Tire changing apparatus for automotive vehicle wheels is well known and highly developed at the present time. This apparatus, of the most commonly known type is generally limited to disk wheels which are substantially flat and have a central opening through which a substantially cone-shaped clamping element can be inserted for holding the wheel to the frame of the tire changing apparatus while the tire manipulating bars are rotated around the bead of the tire, either for separating the bead from the rim of the wheel, or for manipulating it into place on the wheel rim. This type of tire changing apparatus is not suitable for spoked wheels which usually have a central hub and axle which extend outwardly from the plane of the tire, which hub includes bearings and a shaft which extends out from the ends of the bearings.

The present invention has been developed to overcome these objections and deficiencies of prior tire changing apparatus and has resulted in a simple, practical and novel tire changing apparatus for spoked wheels, whereby the tires may be changed with rapidity and facility, comparable to the disk type of wheel tire changing apparatus.

The tire changing apparatus of this invention is formed of a substantially conventional stand or rack, having a base plate on which to receive the wheel and a wheel hold-down member which is clamped to the base plate in a simple manner, both the base plate and the hold-down member having large central openings through which the hub and central portion of the spoked wheel extend. The hold-down member has a tubular or cylindrical fulcrum member which serves as a leverage fixture for the tire changing bars or levers.

It is, therefore, the principal purpose and objective of this invention to provide an improved and efficient apparatus or machine for the fitting and removal of tires from spoked wheels.

A particular object of the invention is to provide a wheel clamp tire changing apparatus including clamp screws and nuts wherein the clamp member may be removed without removing the nuts from the clamp screw.

An additional object of the invention is to provide a tire changer for spoked wheels including clamp members for the wheel having openings in which the hub and axle portions of the wheel may extend.

More specific objects and advantages of the invention will appear and be brought out more fully in the following specification, reference being had to the accompanying drawing, wherein:

FIGURE 1 is a perspective, exploded view of a tire changing apparatus embodying the present invention.

FIGURE 2 is a persepctive view of the apparatus of FIGURE 1 shown during an initial stage of tire removal.

FIGURE 3 is a view similar to FIGURE 2, showing the apparatus during a tire setting operation.

FIGURE 4 is a partial view, in section, showing a detail of the apparatus shown in FIGURES 1 to 3.

Referring more particularly to the drawing the tire changer of this invention comprises a tire supporting frame, indicated generally at 10, which includes a base plate 11, a pedestal 12, and a hold-down member 13, supported from pedestal 12 by a plurality of braces 14, these parts all being preferably secured together, as by welding. A tubular receptacle 15 is mounted on base plate 11, for holding the tire changing tools 16 and 17, when not in use. A plurality of clamp screws 18 extend upwardly from base member 13, and have threaded ends for nuts 19. Washers are indicated at 19a.

Numeral 20 indicates the wheel generally, having a tire 21, spokes 22, and a hub 23, having suitable bearings for an axle 24, which is seen to extend onwardly from the hub. Wheel 20 also includes a pair of rims, 25, against which the beads of the tire are pressed.

A wheel hold-down member 26 comprises an annular plate formed with somewhat L-shaped slots 27, through which clamp screws 18 may extend, and a plurality of struts 28 extend angularly upward from member 26, the upper ends of the struts being secured to a collar 29, which forms a bearing for a tubular tool fulcrum member 30. Member 30 has a pair of diametral slots 31 in which to receive the narrow end portions of the tire tools 16 and 17.

The radial portions of slots 27 are enlarged at 27a whereby to permit nuts 19 and washers 19a to pass therethrough without necessitating removal thereof from screws 18 when the hold-down member 26 is being removed from clamping position and vice-versa.

The operation of the invention should be clear from the foregoing description. Wheel 20 is placed on supporting base 13, with clamp screws 18 extending upwardly between the spokes 22. The hold-down member 26 is then placed on the wheel and secured to the base member by nuts 19 on the clamp screws which extend through the L-shaped slots 27 of the hold-down member, as may be seen in FIGURES 2 and 3, from which it will be apparent that the hold-down member rests on rim 25 of the wheel. The hub 23, axle 24 and the central portion of the wheel 20 extend into the openings of the hold-down member and the base member, and it will be seen that axle 24 may extend into the bore of tubular member 30. The tire 21 may then be removed from the wheel 20 by the use of tire removing tool 16 which can bear against fulcrum 30 as shown in FIGURE 2. Moreover the tire may be removed from the wheel by use of tool 17, the flattened end of which extends through slots 31 of the fulcrum, 30, which is free to rotate on bearing 29, shown in FIGURE 3.

From the foregoing description it will appear clearly that the above-mentioned objects and advantages of my novel tire changing apparatus for spoked wheels have been achieved in the structure shown.

While I have herein shown and described my invention in what I have conceived to be the most practical and preferred embodiments, it is recognized that departures may be made therefrom within the scope of my invention, which is not to be limited to the details disclosed herein but is to be accorded the full scope of the claims so as to embrace any and all equivalent devices and methods.

What is claimed is:

1. A tire changer for spoked wheels comprising:
   a base member having a plurality of clamp screws extending upwardly therefrom adapted to extend between the spokes of a wheel;
   and a wheel hold-down member adapted for clamp engagement with said base member clamp screws having an integral tool-fulcrum cylinder portion.

2. A tire changer for spoked wheels comprising:
   a base member having a plurality of clamp screws extending upwardly therefrom adapted to extend between the spokes of a wheel;
   and a wheel hold-down member adapted for clamp engagement with said base member clamp screws having an integral tool-fulcrum tubular portion,
   said member being formed with a central opening adapted to admit the central hub portion of a spoked wheel.

3. A tire changer for spoked wheels comprising:
   a base member having a plurality of clamp screws extending upwardly therefrom adapted to extend between the spokes of a wheel;
and a wheel hold-down member adapted for a clamp engagement with said base member clamp screws having an integral tool-fulcrum tubular portion,
said member being formed with a central opening adapted to admit the central hub portion of a spoked wheel,
said tubular portion providing means for centering a wheel on said base member.

4. A tire changer for spoked wheels comprising:
a base member having a plurality of clamp screws extending upwardly therefrom adapted to extend between the spokes of a wheel;
and a annular wheel hold-down member having a plurality of slots to receive said base member clamp screws, said hold-down member having an integral tool-fulcrum cylinder portion.

5. A tire changer for spoked wheels comprising:
a base plate member having a plurality of clamp screws extending upwardly therefrom adapted to extend between the spokes of a wheel;
an annular wheel hold-down member adapted for clamp engagement with said base member clamp screws, a coaxial tool-fulcrum cylinder, and a plurality of inclined struts securing said cylinder to said hold-down member.

References Cited by the Applicant
UNITED STATES PATENTS

| | | |
|---|---|---|
| 1,416,094 | 5/22 | Krauska. |
| 1,824,246 | 9/31 | Van Daam. |
| 2,418,849 | 4/47 | Polt. |
| 2,607,403 | 10/52 | Patterson. |
| 2,661,793 | 12/53 | Rockwell. |

GRANVILLE Y. CUSTER, JR., *Primary Examiner.*